United States Patent
Evans et al.

(10) Patent No.: US 8,496,382 B2
(45) Date of Patent: Jul. 30, 2013

(54) BI-DIRECTIONAL TAPERED ROLLER BEARING ASSEMBLY WITH IMPROVED WEAR RESISTANCE

(75) Inventors: Ryan D. Evans, North Canton, OH (US); Gary E. Kreider, Massillon, OH (US); Gary L. Doll, Canton, OH (US)

(73) Assignee: The Timken Company, Canton, OH (US)

( * ) Notice: Subject to any disclaimer, the term of this patent is extended or adjusted under 35 U.S.C. 154(b) by 438 days.

(21) Appl. No.: 12/526,720

(22) PCT Filed: Feb. 14, 2008

(86) PCT No.: PCT/US2008/053947
§ 371 (c)(1),
(2), (4) Date: Aug. 11, 2009

(87) PCT Pub. No.: WO2008/106330
PCT Pub. Date: Sep. 4, 2008

(65) Prior Publication Data
US 2010/0086250 A1    Apr. 8, 2010

Related U.S. Application Data

(60) Provisional application No. 60/892,061, filed on Feb. 28, 2007.

(51) Int. Cl.
*F16C 33/58* (2006.01)
(52) U.S. Cl.
USPC .......................... 384/571; 384/564; 384/907

(58) Field of Classification Search
USPC ............... 384/492, 561, 564, 565, 569, 571, 384/907
See application file for complete search history.

(56) References Cited

U.S. PATENT DOCUMENTS

| 4,696,581 | A | * | 9/1987 | Tsushima et al. | 384/565 |
| 5,112,146 | A | | 5/1992 | Stangeland | |
| 5,503,481 | A | * | 4/1996 | Hashimoto et al. | 384/569 |
| 5,593,234 | A | | 1/1997 | Liston | |
| 5,735,612 | A | * | 4/1998 | Fox et al. | 384/448 |
| 6,261,061 | B1 | | 7/2001 | Pfaffenberger | |
| 6,340,245 | B1 | * | 1/2002 | Horton et al. | 384/492 |
| 6,464,401 | B1 | | 10/2002 | Allard | |
| 6,517,249 | B1 | * | 2/2003 | Doll | 384/492 |

(Continued)

FOREIGN PATENT DOCUMENTS

| WO | WO 99/14512 | 3/1999 |
| WO | WO 01/33091 | 5/2001 |
| WO | WO 03/085276 | 10/2003 |
| WO | WO 2005/005866 | 1/2005 |
| WO | WO 2006/101989 | 9/2006 |

OTHER PUBLICATIONS

International Search Report and Written Opinion for International Application No. PCT/US2008/053947; mailed Jun. 13, 2008.

(Continued)

*Primary Examiner* — James Pilkington
(74) *Attorney, Agent, or Firm* — Polster, Lieder, Woodruff & Lucchesi, LC

(57) ABSTRACT

The wear resistance of a bi-directional tapered roller bearing is improved by applying a tribological coating to both the small and large end faces of the roller and to at least one of the rib faces of the bearing assembly.

17 Claims, 1 Drawing Sheet

U.S. PATENT DOCUMENTS

| | | |
|---|---|---|
| 6,764,219 B2 * | 7/2004 | Doll et al. .................. 384/565 |
| 7,806,598 B2 * | 10/2010 | Doll et al. .................. 384/569 |
| 7,874,736 B2 * | 1/2011 | Ueno et al. .................. 384/565 |
| 2003/0185478 A1 | 10/2003 | Doll et al. |
| 2004/0223676 A1 | 11/2004 | Pope et al. |
| 2009/0067985 A1 | 3/2009 | Dobek, Jr. et al. |

OTHER PUBLICATIONS

Preveraud J-F: "Un Roulement Bidirectionnel A Rouleaux Coniques" Bureaux D'Etudes, CEP Information Technologie, Paris, FR, No. 51, Apr. 1, 1989, p. 27/28.

* cited by examiner

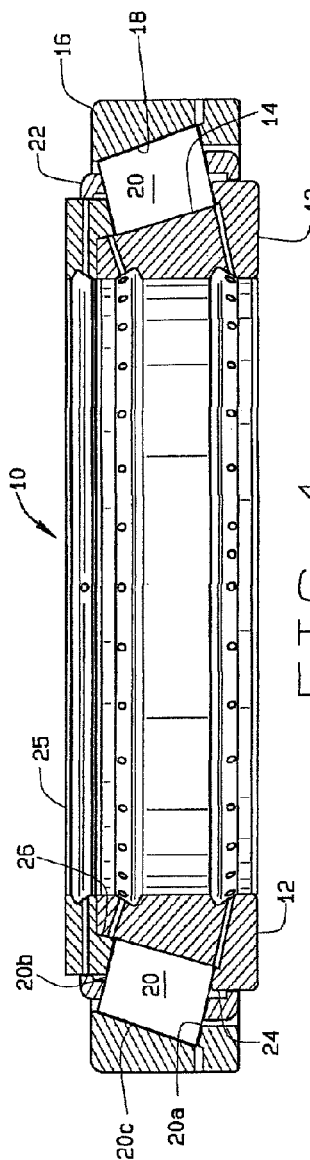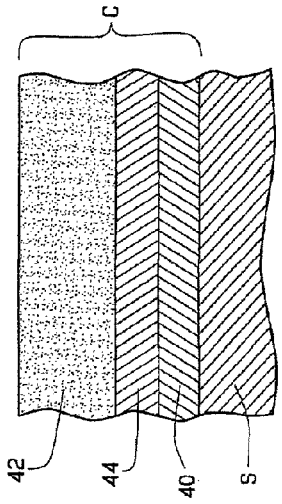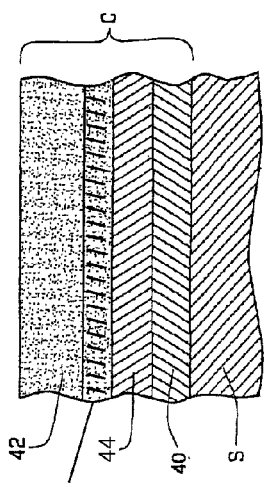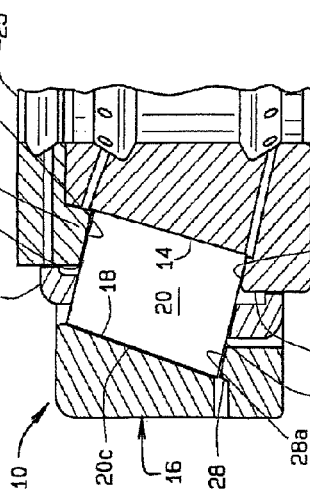
FIG. 1
FIG. 3
FIG. 3A
FIG. 2

BI-DIRECTIONAL TAPERED ROLLER BEARING ASSEMBLY WITH IMPROVED WEAR RESISTANCE

CROSS-REFERENCE TO RELATED APPLICATIONS

This application is a National Stage of International Application No. PCT/US2008/053947, filed Feb. 14, 2008, which claims priority to U.S. Provisional App. No. 60/892,061, which was filed on Feb. 28, 2007. The disclosures of which are incorporated herein by reference in their entirety.

TECHNICAL FIELD

The present disclosure relates to tapered roller bearings, and in particular, to a bi-directional tapered roller bearing having improved wear resistance.

BACKGROUND ART

Examples of bi-directional tapered roller bearings are shown in U.S. Pat. Nos. 6,464,401 and 5,735,612, which are incorporated herein by reference. Bi-directional bearings handle axial loads in both axial directions. Such bearings include a cone defining a tapered inner raceway, a cup defining a tapered outer raceway and a plurality of tapered rollers between the inner and outer raceways. The bearing assembly includes at least a thrust rib on the cup adjacent the large diameter end of the roller and a second rib on the cone adjacent the small diameter end of the roller. The two ribs have associated rib faces, and the rollers are positioned between the two rib faces. In contrast, a uni-directional tapered roller bearing will have only a single thrust rib.

Bi-directional tapered roller assemblies are susceptible to abrasive and adhesive wear at the sliding contacts between the rolling elements and the cup/cone rib faces in the presence of debris or in low lubrication (e.g., oil-out) conditions. Experiments have shown that both internally generated and external debris are especially harmful at the rib-roller end contacts because they can become trapped within the multi-rib bearing and cannot easily flow away from the rib/roller end contacts. Similarly, the presence of extra rib-roller end sliding contacts relative to single rib tapered roller bearing designs can make bi-directional tapered roller bearings more susceptible to rib-roller end scuffing or scoring damage in oil-out condition.

BRIEF SUMMARY

A bi-directional tapered roller bearing comprises a tapered inner raceway, a tapered outer raceway facing the tapered inner raceway, and a plurality of tapered rollers positioned between the tapered inner and outer raceways. The tapered rollers have a side surface, a large end face at a large diameter end of the tapered roller and a small end face at a small diameter end of the tapered roller. The bearing includes at least a first rib at one of an axial inner or outer edge of the inner raceway and a second rib at the other of the axial inner and outer edges of the outer raceway. The first and second ribs each define a rib face. One of the rib faces is adjacent the large end of the tapered roller and the other rib is adjacent the small end of the tapered roller. We have found that by applying a tribological coating to both the large end and the small end of the tapered roller the wear resistance of the bearing can be improved. The coating can also be applied to at least one of the first and second rib faces.

The coating can have a thickness of less than 10 µm and a hardness equal to or greater than the hardness of the substrate to which it is applied. The coating can, for example, have a hardness of at least about 9 GPa as measured by nanoindentation with a Berkovich diamond indenter.

The coating comprises an amorphous carbon-based or hydrocarbon-based thin film coating. The coating can be reinforced with titanium (Ti), tungsten (W), chromium (Cr), tantalum (Ta), silicon (Si), vanadium (V), nickel (Ni), niobium (Nb), iron (Fe) or zirconium (Zr) or carbidic inclusions thereof. In a specific embodiment, the coating can comprise a tungsten carbide-reinforced amorphous hydrocarbon nanocomposite coating.

The coating comprises an adhesion layer applied to the surface of the substrate to be coated and a top functional layer over the adhesion layer. The adhesion layer can be chromium (Cr), titanium (Ti), tantalum (Ta), nickel (Ni), molybdenum (Mo), iron (Fe) or silicon (Si). Although it is preferred that the adhesion layer be comprised of the dominant element only (e.g., 100 atomic % Cr), it can include other elements such as carbon (C), hydrogen (H), oxygen (O) and combinations thereof. However, if the adhesion layer includes C, H or O, the C, H and/or O shall comprise no more than about 75 atomic % of the adhesion layer. That is, the dominant element comprises at least 25 atomic % of the adhesion layer.

The top functional layer can be a hard carbonaceous layer that is comprised of amorphous carbon or amorphous hydrocarbon. The top functional layer can consist only of amorphous carbon (C) or amorphous hydrocarbon (a:C—H). Alternatively, the top functional layer can include the elements oxygen (O), nitrogen (N), boron (B), fluorine (F) or combinations thereof. The carbonaceous top layer may also include Ti, W, Cr, Ta, Si, V, Nb, Zr, Mo, O, N, B, F or combinations thereof as additive elements. However, the additive element(s) shall not exceed 50 atomic % of the total top layer composition, the balance of composition being carbon and hydrogen. It is also possible for the carbonaceous functional top layer to have no additives and consist of only amorphous carbon or amorphous hydrocarbon.

In one variation, the coating can include a gradient layer between the adhesion layer and the top functional layer. In this instance, the gradient layer transforms from the composition of the adhesion layer adjacent the adhesion layer to the composition of the top functional layer adjacent the top functional layer. In another variation, the coating can include a Cr/WC/a-C:H gradient layer over the adhesion layer and a WC/a-C:H mid-layer over the gradient layer. The top functional layer covers the mid-layer and is comprised of a-C:H.

BRIEF DESCRIPTION OF THE SEVERAL VIEWS OF THE DRAWINGS

FIG. 1 is a cross-sectional view of a bi-directional tapered roller bearing applied to a member;

FIG. 2 is an enlarged fragmentary cross-sectional view of the bearing; and

FIG. 3 is an enlarged schematic drawing of a coating applied to a surface of the bearing.

FIG. 3A is and enlarged schematic drawing of another coating applied to a surface of the bearing.

Corresponding reference numerals will be used throughout the several figures of the drawings.

DETAILED DESCRIPTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A bi-directional tapered roller bearing 10 is shown generally in FIGS. 1 and 2. The bearing 10 comprises a cone 12 defining an inner tapered raceway 14, a cup 16 defining a tapered outer raceway 18, and a plurality of tapered rollers 20 positioned between the inner and outer raceways. The rollers are separated from each other by a cage 22. The rollers 20 each have a large diameter end 20a, a small diameter end 20b and a tapered surface 20c. The inner and outer raceways 14 and 18 and the roller surface 20c are all formed such that there is rolling motion between the rollers and the raceways. The cone 12 includes a thrust rib 24 at a wide diameter end of the raceway 14. A rib ring adjacent the small diameter end of the raceway 14 defines a retaining rib 26 which is adjacent the small diameter end of the raceway 14. A third rib 28 adjacent the cup 16 is positioned to be adjacent the large diameter end 22a of the roller. The retaining rib 26 is separate from the cone 12 and the third rib is separate from the cup 16 to facilitate assembly of the bearing assembly. The ribs 24, 26 and 28 each define respective rib faces 24a, 26a and 28a, respectively which are generally perpendicular to the raceway. The rib 24 is shown to be integral with the cone 12, while the ribs 26 and 28 are shown to be separate from their respective races. However, the bearing assembly can be made with the ribs 26 and 28 integral with their races and with the rib 24 being separate from its race.

Sliding contact occurs between the large and small ends of the rollers and the rib faces. Hence, in the bearing 10, sliding contact will occur between the roller large end 20a and the rib faces 24a and 28a as well as between the roller small end 20b and the rib face 26a. Experiments have shown that both internally-generated and external debris are especially harmful at the rib-roller end contact because the debris can become trapped within the multi-rib bearing assembly, and cannot easily flow away from the rib/roller interface. Further, the presence of the extra rib/roller interfaces (as compared to uni-directional thrust tapered roller bearings which have only a single thrust rib) makes bi-directional roller bearings more susceptible to rib-roller end scuffing or scoring damage in oil-out conditions.

If a bi-directional tapered roller bearing experiences failure, the debris generated from the raceways cannot escape the contact regions. This leads to severe adhesive wear at the sliding rib-roller end contacts, ultimately resulting in excessive bearing torque (and failure). Application testing with coatings on only the roller ends 20a,b protected the roller end surfaces, but did not prevent massive adhesive wear damage on the rib faces that resulted from debris particle/rib face adhesive interactions in the sliding contacts. Coating at least one rib face in addition to the roller ends is expected to delay debris-related failure of the rib and thus improve the overall wear resistance of the bearing.

The coating is an amorphous carbon or hydrocarbon (sometimes referred to as a diamond-like carbon, or DLC) based thin film tribological coating. As just noted, the coating is applied to the roller end faces and optionally to one or both of the rib faces. Preferably, the coating is applied to the end faces of all the rollers in the bearing assembly. One acceptable coating is a WC/aC:H coating available from The Timken Company under the name ES300. The coating has a thickness of less than about 10 micrometers. The coating has a hardness equal to or greater than the hardness of the substrate to which it is applied. The coating can, for example, have a hardness of at least about 9 GPa as measured by nanoindentation with a Berkovich diamond indenter. The DLC coating can be reinforced with additional elements such as titanium (Ti), tungsten (W), chromium (Cr), tantalum (Ta), silicon (Si), vanadium (V), nickel (Ni), niobium (Nb), iron (Fe) or zirconium (Zr) or carbidic inclusions thereof. In one illustrative embodiment, the coating is a tungsten carbide-reinforced amorphous hydrocarbon nano-composite coating. The tungsten carbide-reinforced amorphous hydrocarbon nano-composite coating is a member of this class.

The coating C (FIG. 3) comprises at least two layers, an adhesive layer or interlayer 40 which is applied to the substrate S (i.e., rib face or roller end) and a top functional layer 42 which covers the adhesion layer 40. The adhesion layer can be chromium (Cr), titanium (Ti), tantalum (Ta), nickel (Ni), molybdenum (Mo), iron (Fe) or silicon (Si). Although it is preferred that the adhesion layer 40 be comprised of the dominant element only (e.g., 100 atomic % Cr), it can include other elements such as carbon (C), hydrogen (H), oxygen (O) and combinations thereof. However, the C, H and/or O shall comprise no more than about 75 atomic % of the adhesion layer. Stated differently, the dominant element comprises at least 25 atomic % of the adhesion layer.

The top functional layer 42 comprises amorphous carbon (or amorphous hydrocarbon). The top functional layer may include the elements oxygen (O), nitrogen (N), boron (B), fluorine (F) or combinations thereof. The carbonaceous top layer may include one or more of the additive elements noted above (Ti, W, Cr, Ta, Si, V, Nb, Zr, Mo, O, N, B, and F). However, the amount of additive element(s) shall not exceed 50 atomic % of the total top layer composition, the balance of the top layer composition being carbon and hydrogen. It is also possible for the carbonaceous functional top layer to have no additives and consist of only amorphous carbon (C) or amorphous hydrocarbon (C and H).

Typically, for a steel substrate, the adhesion layer 40 will be chromium (Cr) and the functional layer 42 will be a hard carbonaceous layer. A gradient layer 44 can be formed between the adhesion layer 40 and the top functional layer 42 with the gradient layer transforming from the composition of the adhesion layer to the composition of the final or top functional layer. Coatings with additional layers (FIG. 3A) are also included, such as Cr (adhesion layer 40)+Cr/WC/a-C:H (gradient layer 44)+WC/a-C:H (mid-layer 43)+a-C:H (top layer 42). In this instance, the gradient layer will transform from being chromium adjacent the adhesive layer to being WC/a-C:H. The WC/a-C:H mid-layer will then transform from being WC/a-C:H adjacent the gradient layer to being a-C:H adjacent the top functional layer. Hence, the mid-layer defines a second gradient layer. It is important that the top functional layer be a hard carbonaceous layer in any embodiment of the coating (which may or may not include the other elements as described above).

The coating composition that is applied to the roller end faces and the rib faces need not be the same. For example, the a WC/a-C:H coating can be applied to the roller ends and a TiC/a-C:H coating can be applied to the rib faces.

The coating can be deposited using plasma techniques for vapor deposition, but is not limited to physical vapor deposition (PVD) or plasma-enhanced chemical vapor deposition (PECVD). As is known, the gradient layers are formed by changing the ratio of components that are being coated onto the substrate. Thus, there is no sharp line separation between adjacent layers.

We expect that by applying a wear resistant coating to both the small and large ends of all the rollers and optionally to at least one rib face will improve the wear resistance of the bearing assembly.

As various changes could be made in the above constructions without departing from the scope of the invention, it is intended that all matter contained in the above description or shown in the accompanying drawings shall be interpreted as illustrative and not in a limiting sense.

The invention claimed is:

1. A method of improving the wear resistance of bi-directional tapered roller bearings; the roller bearings comprising a tapered inner raceway, a tapered outer raceway facing the tapered inner raceway, a plurality of tapered rollers positioned between the tapered inner raceway and the tapered outer raceway, the tapered rollers having a side surface, a large end face at a large diameter end of the tapered roller and a small end face at a small diameter end of the tapered roller; a first rib at an axial outer edge of the inner raceway; a second rib at an axial inner edge of the inner raceway; a third rib at an axial outer edge of the outer raceway, the first rib, the second rib and the third rib respectively define a first rib face, a second rib face and a third rib face, the first rib face and the third rib face being adjacent the large end of the tapered roller and the second rib face being adjacent the small end of the tapered roller, wherein the method comprises:
   applying a roller tribological coating comprising WC/a-C:H to both the large end and the small end of the tapered roller, the roller tribological coating having a hardness of at least 9 GPa that is harder than internally-generated metallic debris particles within the bearing; and
   applying a rib tribological coating to one or more of the first rib face, the second rib face and the third rib face, wherein applying the rib tribological coating comprises:
      applying a rib adhesion layer comprising Cr to the one or more first, second and third rib faces;
      applying a distinct rib gradient layer comprising Cr/WC/a-C:H over the rib adhesion layer;
      applying a distinct rib mid-layer comprising WC/a-C:H over the rib gradient layer; and
      applying a distinct rib top functional layer comprising a-C:H over the rib mid-layer, the rib top functional layer having a hardness of at least 9 GPa that is harder than internally-generated metallic debris particles within the bearing, wherein
   the roller and rib tribological coatings prevent abrasive wear of the roller ends and the respective one or more of the first rib face, the second rib face and the third rib face caused by the metallic debris particles.

2. The method of claim 1 comprising applying the rib tribological coating to the first rib face and the second rib face.

3. The method of claim 1 wherein said roller coating has a thickness of less than 10 μm.

4. The method of claim 1 wherein applying the roller coating comprises applying a roller adhesion layer to the surface to be coated and applying a distinct roller top functional layer over the roller adhesion layer.

5. The method of claim 4 wherein the roller adhesion layer is chosen from the group consisting of tantalum (Ta), nickel (Ni), molybdenum (Mo), iron (Fe) or silicon (Si).

6. The method of claim 5 wherein the roller adhesion layer includes low levels carbon (C), hydrogen (H), oxygen (O) and combinations thereof, the adhesion layer including no more than about 75 atomic % of C, H and/or O.

7. The method of claim 4 wherein one or more additives are present in the roller top functional layer; the additives being chosen from the group consisting of chromium (Cr), titanium (Ti), tantalum (Ta), nickel (Ni), molybdenum (Mo), iron (Fe), silicon (Si), tungsten (W), vanadium (V), niobium (Nb), zirconium (Zr), carbidic inclusions and combinations thereof; the additives comprising 50 atomic % or less of the total top functional layer composition, the balance of the roller top functional layer composition being carbon and hydrogen.

8. The method of claim 4 wherein the roller top functional layer includes oxygen (O), nitrogen (N), boron (B), and/or fluoride (F).

9. The method of claim 4 comprising forming a distinct roller gradient layer between the roller adhesion layer and the roller top functional layer.

10. A bi-directional tapered roller bearing comprising:
   a tapered inner raceway;
   a tapered outer raceway facing the tapered inner raceway;
   a plurality of tapered rollers positioned between the tapered inner raceway and the tapered outer raceway, the tapered rollers having a side surface, a large end face at a large diameter end of the tapered roller and a small end face at a small diameter end of the tapered roller, each roller comprising a roller tribological coating comprising WC/a-C:H disposed on both the large end and the small end, the roller tribological coating having a hardness of at least 9 GPa that is harder than internally-generated metallic debris particles within the bearing;
   a first rib at an axial outer edge of the inner raceway;
   a second rib at an axial inner edge of the inner raceway; and
   a third rib at an axial outer edge of the outer raceway, the first rib, the second rib and the third rib respectively define a first rib face, a second rib face and a third rib face, the first rib face and the third rib face being adjacent the large end of the tapered roller and the second rib face being adjacent the small end of the tapered roller, one or more of the first, second and third rib faces comprising a rib tribological coating, wherein the rib tribological coating comprises:
      a rib adhesion layer comprising Cr disposed on the one or more first, second and third rib faces;
      a distinct rib gradient layer comprising Cr/WC/a-C:H disposed over the rib adhesion layer;
      a distinct rib mid-layer comprising WC/a-C:H disposed over the rib gradient layer; and
      a distinct rib top functional layer comprising a-C:H disposed over the rib mid-layer, the rib top functional layer having a hardness of at least 9 GPa that is harder than internally-generated metallic debris particles within the bearing, wherein
   the roller and rib coatings prevent abrasive wear of the roller ends and the respective one or more of the first rib face, the second rib face and the third rib face caused by the metallic debris particles.

11. The bearing of claim 10 wherein the roller tribological coating is on both said first rib face and said second rib face.

12. The bearing of claim 10 wherein said roller coating has a thickness of less than 10 μm.

13. The bearing of claim 10 wherein the roller coating comprises a roller adhesion layer applied to the surface to be coated and a distinct roller top functional layer over the roller adhesion layer.

14. The bearing of claim 13 wherein the roller adhesion layer is chosen from the group consisting of tantalum (Ta), nickel (Ni), molybdenum (Mo), iron (Fe) or silicon (Si).

15. The bearing of claim 13 wherein the roller adhesion layer includes low levels carbon (C), hydrogen (H), oxygen (O) and combinations thereof, the amount of C, H and/or O in the adhesion layer not exceeding about 75 atomic % of the adhesion layer.

16. The bearing of claim 13 wherein one or more additives are present in the roller carbonaceous top functional layer; the additives being chosen from the group consisting of chromium (Cr), titanium (Ti), tantalum (Ta), nickel (Ni), molybdenum (Mo), iron (Fe), silicon (Si), tungsten (W), vanadium (V), niobium (Nb), zirconium (Zr), oxygen (O), nitrogen (N), boron (B), fluoride (F), carbidic inclusions and combinations thereof; the additives comprising 50 atomic % or less of the total roller top functional layer composition, the balance of the top functional layer composition being carbon and hydrogen.

17. The bearing of claim 13 wherein the roller coating includes a distinct gradient layer between the roller adhesion layer and the roller top functional layer.

\* \* \* \* \*

UNITED STATES PATENT AND TRADEMARK OFFICE
CERTIFICATE OF CORRECTION

PATENT NO.         : 8,496,382 B2
APPLICATION NO.    : 12/526720
DATED              : July 30, 2013
INVENTOR(S)        : Evans et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Fifteenth Day of September, 2015

Michelle K. Lee
*Director of the United States Patent and Trademark Office*